(12) United States Patent
Chen

(10) Patent No.: US 9,091,879 B2
(45) Date of Patent: Jul. 28, 2015

(54) LIQUID CRYSTAL DISPLAY PANEL AND LIQUID CRYSTAL DISPLAY APPARATUS

(75) Inventor: Hsiao-hsien Chen, Shenzhen (CN)

(73) Assignee: SHENZHEN CHINA STAR OPTOELECTRONICS TECHNOLOGY CO. LTD., Shenzhen (CN)

(*) Notice: Subject to any disclaimer, the term of this patent is extended or adjusted under 35 U.S.C. 154(b) by 0 days.

(21) Appl. No.: 13/581,472

(22) PCT Filed: May 15, 2012

(86) PCT No.: PCT/CN2012/075523
§ 371 (c)(1),
(2), (4) Date: Aug. 28, 2012

(87) PCT Pub. No.: WO2013/166736
PCT Pub. Date: Nov. 14, 2013

(65) Prior Publication Data
US 2015/0077684 A1    Mar. 19, 2015

(30) Foreign Application Priority Data
May 11, 2012 (CN) .......................... 2012 1 0146586

(51) Int. Cl.
*G02F 1/1335* (2006.01)

(52) U.S. Cl.
CPC ...... *G02F 1/133514* (2013.01); *G02F 2201/16* (2013.01)

(58) Field of Classification Search
CPC .................................................. G02F 1/133514
USPC ........................................................ 349/106
See application file for complete search history.

(56) References Cited

U.S. PATENT DOCUMENTS

| 6,690,438 B2* | 2/2004 | Sekiguchi | 349/114 |
| 6,731,359 B1* | 5/2004 | Fukaya | 349/112 |
| 2004/0207783 A1* | 10/2004 | Togashi | 349/113 |

* cited by examiner

*Primary Examiner* — James Dudek
(74) *Attorney, Agent, or Firm* — Mark M. Friedman

(57) ABSTRACT

The present invention provides a liquid crystal display (LCD) panel and a liquid crystal display apparatus. The LCD panel comprises a color filter sheet. A second substrate of the LCD panel comprises a plurality of pixel units. Each of the color filters of the LCD panel corresponds to one of the pixel regions of the pixel units. A liquid crystal layer is disposed between the first substrate and the second substrate. The color filter sheet includes color regions corresponding to the color filters, respectively, wherein the color regions and the corresponding color filters have the same color.

18 Claims, 3 Drawing Sheets

LIQUID CRYSTAL DISPLAY PANEL AND LIQUID CRYSTAL DISPLAY APPARATUS

FIELD OF THE INVENTION

The present invention relates to a field of a liquid crystal display technology, and more particularly to a liquid crystal display (LCD) panel and an LCD apparatus.

BACKGROUND OF THE INVENTION

Referring to FIG. 1, FIG. 1 is a structural diagram showing a conventional LCD. The LCD comprises a backlight source 11, an upper polarizer 12, a thin film transistor (TFT) array substrate 13, a liquid crystal layer (cell) 14, a color filter (CF) substrate 15 and a lower polarizer 16.

A chroma of light rays emitted from the LCD is determined according to a backlight of the backlight source 11 and a composition of color filters of a color filter layer 152 between a black matrix 151. The pigment in the color filter layer 152 can be increased for increasing the chroma. To increase the pigment in the color filter layer 152, a thickness thereof can be increased, and the composition of the color filters of the color filter layer 152 can be varied.

When increasing the thickness of the color filter layer 152 for increasing the chroma, referring to FIG. 2, in practice, a continuity of the surface of the color filter layer 152 is poor, and a under-cut problem occurs, and thus a common electrode 153 (ITO) of the CF substrate 15 is disconnected, resulting in the abnormal display. In addition, the pigment in the color filter layer 152 will affect a contrast of the LCD. When increasing the thickness of the color filter layer 152, the collision between the polarized light rays and the pigment particles will increase, thereby transforming the polarized light rays into non-polarized light rays as well as deteriorating the contrast of the LCD.

When varying the composition of the color filters of the color filter layer 152, for example, a percentage of the pigment in the color filter is increased, a ratio of polymer/monomer decreases, and the color filter layer 152 may not be achieved by an exposing and developing process.

As a result, it is necessary to provide an LCD panel and an LCD apparatus to solve the problems existing in the conventional technologies, as described above.

SUMMARY OF THE INVENTION

The present invention provides an LCD panel and an LCD apparatus, so as to improve the chroma of displayed images, thereby providing the images with greater definition.

An object of the present invention is to provide a liquid crystal display panel, wherein the liquid crystal display panel comprises: a first substrate; a second substrate comprising a plurality of pixel units, wherein each of the pixel units includes pixel regions; a plurality of color filters formed on the first substrate or the second substrate, wherein each of the color filters corresponds to one of the pixel regions of the second substrate, and the color filters have a first thickness; a liquid crystal layer disposed between the first substrate and the second substrate; and a color filter sheet formed by coating, exposing, developing and curing processes, and having a second thickness, wherein the color filter sheet includes a plurality of color regions corresponding to the color filters, respectively, and the color region and the corresponding color filter have the same color, and the first thickness is less than the second thickness.

In one embodiment of the present invention, the color filters are formed on the first substrate.

In one embodiment of the present invention, the color filter sheet is disposed at an outer side of the first substrate.

In one embodiment of the present invention, the color filters are formed on the second substrate.

In one embodiment of the present invention, the color filter sheet is disposed at an inner side of the first substrate.

In one embodiment of the present invention, the color filter sheet is disposed at an outer side of the first substrate.

The present invention provides an LCD panel and an LCD apparatus, so as to improve the chroma of displayed images, thereby providing the images with greater definition.

Another object of the present invention is to provide a liquid crystal display panel, wherein the liquid crystal display panel comprises: a first substrate; a second substrate comprising a plurality of pixel units, wherein each of the pixel units includes pixel regions; a plurality of color filters formed on the first substrate or the second substrate, wherein each of the color filters corresponds to one of the pixel regions of the second substrate; a liquid crystal layer disposed between the first substrate and the second substrate; and a color filter sheet including a plurality of color regions corresponding to the color filters, respectively, wherein each of the color regions and the corresponding color filter have the same color.

In one embodiment of the present invention, the color filters are formed on the first substrate.

In one embodiment of the present invention, the color filter sheet is disposed at an outer side of the first substrate.

In one embodiment of the present invention, the color filters are formed on the second substrate.

In one embodiment of the present invention, the color filter sheet is disposed at an inner side of the first substrate.

In one embodiment of the present invention, the color filter sheet is disposed at an outer side of the first substrate.

In one embodiment of the present invention, the color filter sheet is formed by coating, exposing, developing and curing processes.

In one embodiment of the present invention, the color filter sheet is formed by printing.

In one embodiment of the present invention, the color filters have a first thickness, and the color filter sheet has a second thickness, and the first thickness is less than the second thickness.

Still another object of the present invention is to provide an LCD apparatus comprising a backlight module and a liquid crystal display panel, wherein the liquid crystal display panel comprises: a first substrate; a second substrate comprising a plurality of pixel units, wherein each of the pixel units includes pixel regions; a plurality of color filters formed on the first substrate or the second substrate, wherein each of the color filters corresponds to one of the pixel regions of the second substrate; a liquid crystal layer disposed between the first substrate and the second substrate; and a color filter sheet including a plurality of color regions corresponding to the color filters, respectively, wherein each of the color regions and the corresponding color filter have the same color.

In one embodiment of the present invention, the color filters are formed on the first substrate.

In one embodiment of the present invention, the color filter sheet is disposed at an outer side of the first substrate.

In one embodiment of the present invention, the color filters are formed on the second substrate.

In one embodiment of the present invention, the color filter sheet is formed by coating, exposing, developing and curing processes.

Compared with the conventional technology, in the present invention, the color filter sheet is disposed on the LCD panel, especially at a light emitting side thereof. The color filter sheet comprises color regions of different colors, and each of the color regions and the corresponding color filter have the same color. With the use of the color filter sheet, the chroma of the light rays emitted from the LCD panel can be improved, thereby greatly improving the color space of displayed images.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
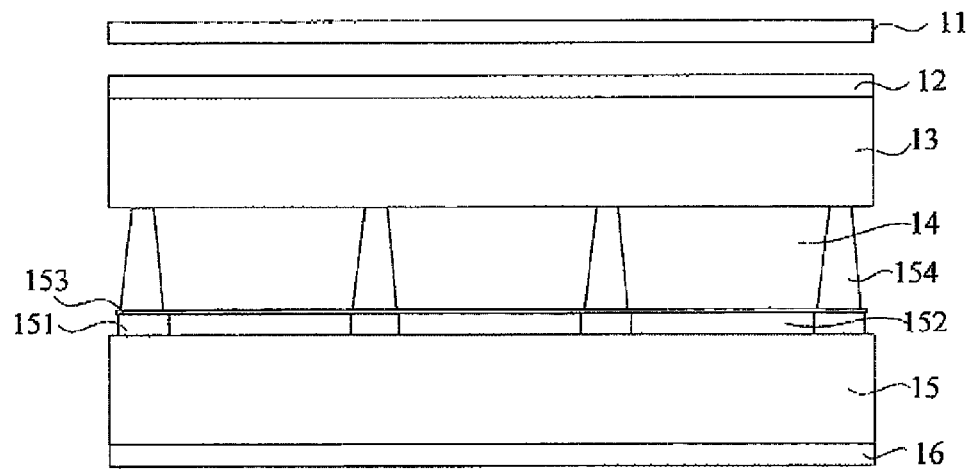
FIG. 1 is a structural diagram showing a conventional LCD.
Figure 2:
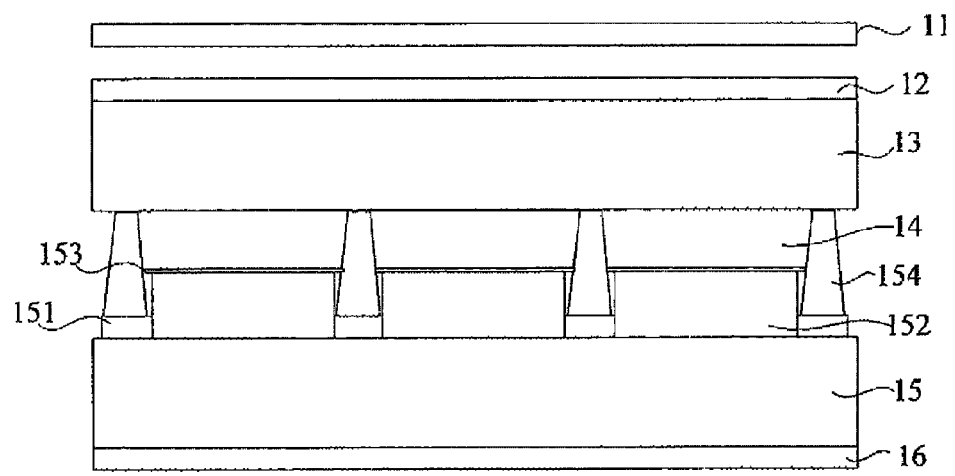
FIG. 2 is a structural diagram showing a color filter layer with an increased thickness shown in FIG. 1.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto. In the drawings, structure-like elements are labeled with like reference numerals.

Figure 3:
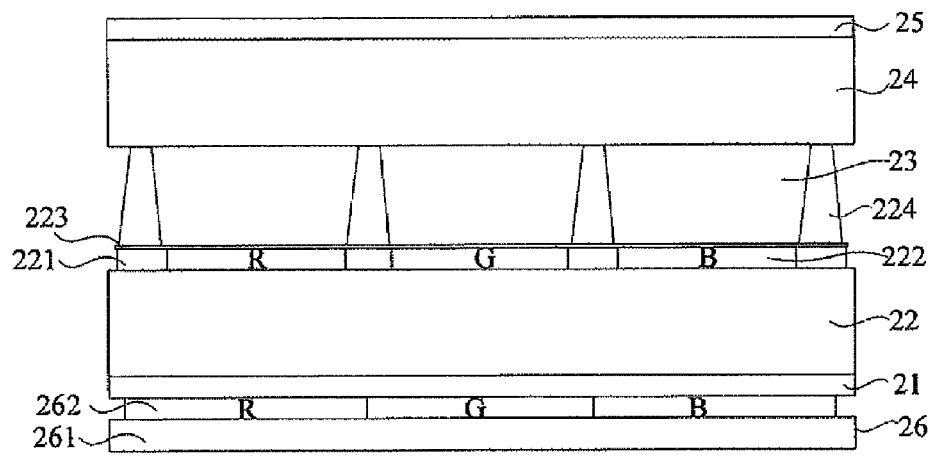
FIG. 3 is a structural diagram showing an LCD panel according to a first preferred embodiment of the present invention.

Referring to FIG. 3, FIG. 3 is a structural diagram showing a liquid crystal display (LCD) panel according to a first preferred embodiment of the present invention.

In the first preferred embodiment, the LCD panel comprises a first polarizer 21, a first substrate 22, a liquid crystal layer 23, a second substrate 24, a second polarizer 25 and a color filter sheet 26. In this case, the liquid crystal layer 23 is formed between the first substrate 22 and the second substrate 24. That is, the liquid crystal layer 23 is positioned at inner sides of the first substrate 22 and the second substrate 24. The first polarizer 21 is disposed at an outer side of the first substrate 22, and the second polarizer 25 is disposed at an outer side of the second substrate 24. The color filter sheet 26 is disposed the outer side of the first substrate 22.

Referring to FIG. 3 again, the first substrate 22 and the second substrate 24 may be realized as glass substrates or flexible plastic substrates. The first substrate 22 may be a glass substrate or other material substrate with color filters (CF), and the second substrate 24 may be a glass substrate or other material substrate with a thin film transistor (TFT) array. It notes that the CF and the TFT array may also be disposed on the same substrate in other embodiments.

In the first preferred embodiment shown in FIG. 3, the first substrate 22 includes a black matrix (BM) layer 221, a plurality of color filters 222, a common electrode 223 and photo spacers (PS) 224, wherein the BM layer 221, the color filters 222, the common electrode 223 and the photo spacers 224 are formed on the first substrate 22 in sequence. The above-mentioned color filters 222 may be red filters (R), green filters (G) or blue filters (B). Certainly, the color filters 222 can further comprise yellow (Y) filters.

A plurality of signal lines, such as data lines and scan lines, are formed on the second substrate 24, and the data lines and scan lines are intersected vertically to form a plurality of pixel units. Each of the pixel units comprises a plurality of pixel regions, such as pixel regions R, G and B. The pixel regions R, G and B correspond to the color filters 222 of the first substrate 22, respectively.

The color filter sheet 26 comprises a glass substrate 261 and a plurality of color regions 262 of different colors, such as red, green and blue. In this embodiment, the color region 262 and the corresponding color filter 222 have the same color. For example, the red color region corresponds to the red color filter, and the green color region corresponds to the green color filter, and the blue color region corresponds to the blue color filter. The color filters 222 have a first thickness, and the color filter sheet 26 has a second thickness, and the first thickness can be greater than, equal to or less than the second thickness. Preferably, the first thickness is less than the second thickness for achieving a greater color space in displaying.

In practice, the color filter sheet 26 is formed by coating, exposing, developing and curing processes. For example, the color regions 262 are formed on the glass substrate 261. Alternatively, the color filter sheet 26 is directly formed on the first substrate 22 by printing.

FIG. 3 is a schematic diagram showing a process of using the liquid crystal display panel according to the first preferred embodiment.

After light rays of a backlight module (not shown) are emitted to the LCD panel, the light rays pass through the second polarizer 25, the second substrate 24, the liquid crystal layer 23, the first substrate 22, the first polarizer 21 and the color filter sheet 26 in sequence.

The color regions 262 of the color filter sheet 26 correspond to the color filters 222 of the first substrate 22, respectively. For example, the red color region corresponds to the red color filter, and the green color region corresponds to the green color filter, and the blue color region corresponds to the blue color filter. Therefore, the chroma of the light rays from the first substrate can be improved by the color filter sheet 26, thereby achieving a greater color space.

Figure 4:
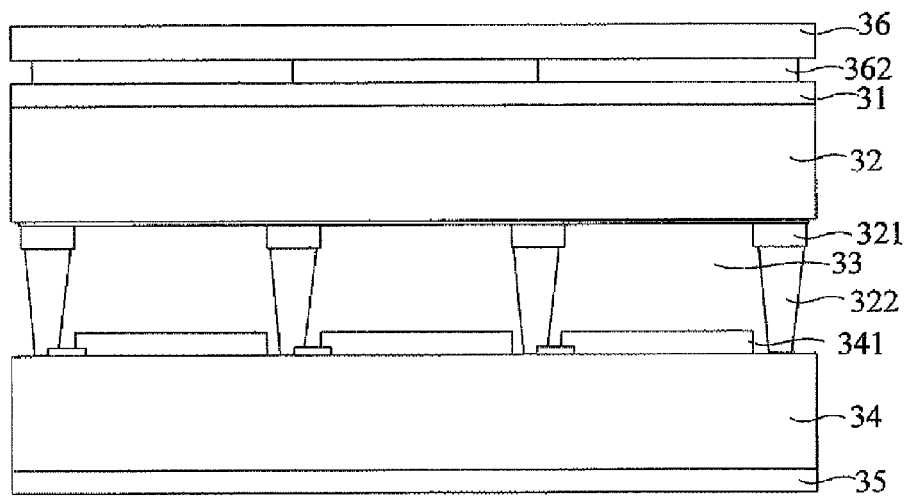
FIG. 4 is a structural diagram showing an LCD panel according to a second preferred embodiment of the present invention.

Referring to FIG. 4, FIG. 4 is a structural diagram showing a liquid crystal display (LCD) panel according to a second preferred embodiment of the present invention.

In the second preferred embodiment, the LCD panel comprises a first polarizer 31, a first substrate 32, a liquid crystal layer 33, a second substrate 34, a second polarizer 35 and a color filter sheet 36. In this case, the liquid crystal layer 33 is formed between the first substrate 32 and the second substrate 34. That is, the liquid crystal layer 33 is positioned at inner sides of the first substrate 32 and the second substrate 34. The first polarizer 31 is disposed at an outer side of the first substrate 32, and the second polarizer 35 is disposed at an outer side of the second substrate 34. The color filter sheet 36 is disposed the outer side of the first substrate 32.

Referring to FIG. 4 again, the first substrate 32 and the second substrate 34 may be realized as glass substrates or flexible plastic substrates. The first substrate 32 may be a glass substrate or other material substrate with color filters, and the second substrate 34 may be a glass substrate or other material substrate with a TFT array.

The difference between the second embodiment shown in FIG. 4 and the first embodiment shown in FIG. 3 is that color filters 341, such as red, green and blue color filters, are formed on the second substrate 34. The color filters 341 can be formed on the second substrate 34 by coating, exposing, developing, curing processes and the like. A plurality of signal lines, such as data lines and scan lines, are further formed on the second substrate 34, and the data lines and scan lines are intersected vertically to form a plurality of pixel units. Each of the pixel units comprises pixel regions, such as pixel regions R, G and B. The pixel regions R, G and B correspond to the red, green and blue color filters, respectively. The first substrate 32 includes a BM layer 321 and photo spacers (PS) 322.

In the second preferred embodiment, the color filter sheet 36 is disposed the outer side of the first substrate 32, and the color filter sheet 26 comprises a glass substrate 261 and a plurality of color regions 262 of different colors, such as red, green and blue. In this embodiment, the color region 362 and the corresponding color filter 322 have the same color. For example, the red color region corresponds to the red color filter, and the green color region corresponds to the green color filter, and the blue color region corresponds to the blue color filter.

The process of using the liquid crystal display panel according to the second preferred embodiment shown in FIG. 4 is similar to the first preferred embodiment shown in FIG. 3, and not mentioned for simplification.

Figure 5:
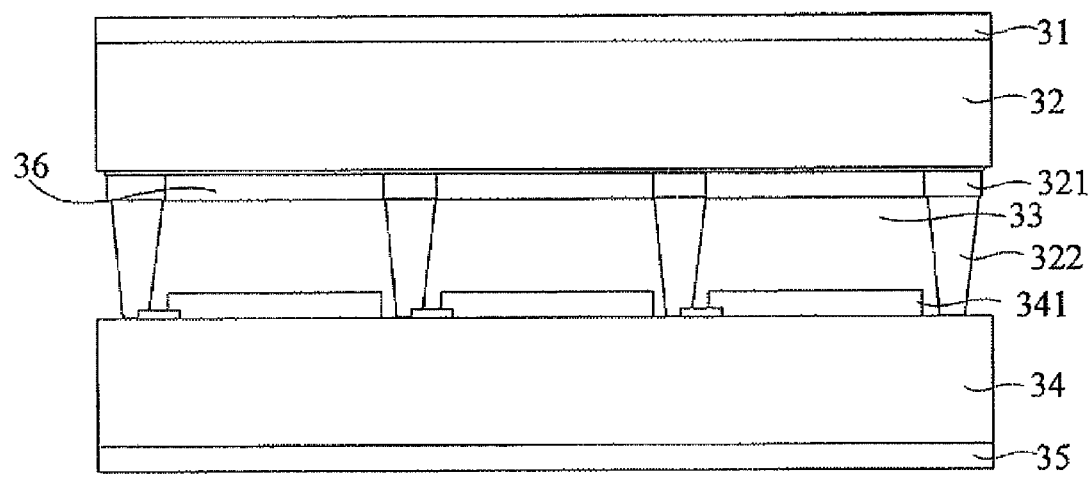
FIG. 5 is a structural diagram showing an LCD panel according to a third preferred embodiment of the present invention.

Referring to FIG. 5, FIG. 5 is a structural diagram showing a liquid crystal display (LCD) panel according to a third preferred embodiment of the present invention.

In the third preferred embodiment, the LCD panel comprises a first polarizer 31, a first substrate 32, a liquid crystal layer 33, a second substrate 34, a second polarizer 35 and a color filter sheet 36. In this case, the liquid crystal layer 33 is formed between the first substrate 32 and the second substrate 34. That is, the liquid crystal layer 33 is positioned at inner sides of the first substrate 32 and the second substrate 34. The first polarizer 31 is disposed at an outer side of the first substrate 32, and the second polarizer 35 is disposed at an outer side of the second substrate 34.

The difference between the third embodiment shown in FIG. 5 and the second embodiment shown in FIG. 4 is that the color filter sheet 36 is disposed on an inner side of the first substrate 32. The color filter sheet 36 comprises a glass substrate 361 and a plurality of color regions 362 of different colors, such as red, green and blue. In this embodiment, the color region 362 and the corresponding color filter 341 have the same color. For example, the red color region corresponds to the red color filter, and the green color region corresponds to the green color filter, and the blue color region corresponds to the blue color filter.

The process of using the liquid crystal display panel according to the third preferred embodiment shown in FIG. 5 is similar to the second preferred embodiment shown in FIG. 4, and not mentioned for simplification.

The present invention further provides an LCD apparatus comprising the backlight module and the LCD panel provided by the present invention. The LCD panel is described above, and not mentioned herein for simplification.

Compared with the conventional technology, in the present invention, the color filter sheet is disposed on the LCD panel, especially at a light emitting side thereof. The color filter sheet comprises color regions of different colors, and each of the color regions and the corresponding color filter have the same color. With the use of the color filter sheet, the chroma of the light rays emitted from the LCD panel can be improved, thereby greatly improving the color space of displayed images.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal display panel, comprising:
   a first substrate;
   a second substrate comprising a plurality of pixel units, wherein each of the pixel units includes pixel regions;
   a plurality of color filters formed on the first substrate or the second substrate, wherein each of the color filters corresponds to one of the pixel regions of the second substrate, and the color filters have a first thickness;
   a liquid crystal layer disposed between the first substrate and the second substrate; and
   a color filter sheet formed by coating, exposing, developing and curing processes, and having a second thickness, wherein the color filter sheet includes a plurality of color regions corresponding to the color filters, respectively, and the color region and the corresponding color filter have the same color, and the first thickness is less than the second thickness;
   wherein, the color regions are formed on a glass substrate, and the color regions are positioned between the glass substrate and a first polarizer;
   wherein, light rays from a backlight module are emitted to the liquid crystal display panel, and the light rays pass through a second polarizer, the second substrate, the liquid crystal layer, the first substrate, the first polarizer, the color regions and the glass substrate in sequence.

2. The liquid crystal display panel according to claim 1, wherein the color filters are formed on the first substrate.

3. The liquid crystal display panel according to claim 2, wherein the color filter sheet is disposed at an outer side of the first substrate.

4. The liquid crystal display panel according to claim 1, wherein the color filters are formed on the second substrate.

5. The liquid crystal display panel according to claim 4, wherein the color filter sheet is disposed at an outer side of the first substrate.

6. A liquid crystal display panel, comprising:
   a first substrate;
   a second substrate comprising a plurality of pixel units, wherein each of the pixel units includes pixel regions;
   a plurality of color filters formed on the first substrate or the second substrate, wherein each of the color filters corresponds to one of the pixel regions of the second substrate;
   a liquid crystal layer disposed between the first substrate and the second substrate; and
   a color filter sheet including a plurality of color regions corresponding to the color filters, respectively, wherein each of the color regions and the corresponding color filter have the same color;
   wherein, the color regions are formed on a glass substrate, and the color regions are positioned between the glass substrate and a first polarizer;
   wherein, light rays from a backlight module are emitted to the liquid crystal display panel, and the light rays pass through a second polarizer, the second substrate, the liquid crystal layer, the first substrate, the first polarizer, the color regions and the glass substrate in sequence.

7. The liquid crystal display panel according to claim 6, wherein the color filters are formed on the first substrate.

8. The liquid crystal display panel according to claim 6, wherein the color filter sheet is disposed at an outer side of the first substrate.

9. The liquid crystal display panel according to claim 6, wherein the color filters are formed on the second substrate.

10. The liquid crystal display panel according to claim 9, wherein the color filter sheet is disposed at an outer side of the first substrate.

11. The liquid crystal display panel according to claim 6, wherein the color filter sheet is formed by coating, exposing, developing and curing processes.

12. The liquid crystal display panel according to claim 6, wherein the color filter sheet is formed by printing.

13. The liquid crystal display panel according to claim 6, wherein the color filters have a first thickness, and the color filter sheet has a second thickness, and the first thickness is less than the second thickness.

14. A liquid crystal display apparatus, comprising a backlight module and a liquid crystal display panel, wherein the liquid crystal display panel comprises:

a first substrate;

a second substrate comprising a plurality of pixel units, wherein each of the pixel units includes pixel regions;

a plurality of color filters formed on the first substrate or the second substrate, wherein each of the color filters corresponds to one of the pixel regions of the second substrate;

a liquid crystal layer disposed between the first substrate and the second substrate; and a color filter sheet including a plurality of color regions corresponding to the color filters, respectively, wherein each of the color regions and the corresponding color filter have the same color;

wherein, the color regions are formed on a glass substrate, and the color regions are positioned between the glass substrate and a first polarizer;

wherein, light rays from the backliqht module are emitted to the liquid crystal display panel, and the light rays pass through a second polarizer, the second substrate, the liquid crystal layer, the first substrate, the first polarizer, the color regions and the glass substrate in sequence.

15. The liquid crystal display apparatus according to claim 14, wherein the color filters are formed on the first substrate.

16. The liquid crystal display apparatus according to claim 14, wherein the color filter sheet is disposed at an outer side of the first substrate.

17. The liquid crystal display apparatus according to claim 14, wherein the color filters are formed on the second substrate.

18. The liquid crystal display apparatus according to claim 14, wherein the color filter sheet is formed by coating, exposing, developing and curing processes.

* * * * *